United States Patent Office 3,655,739
Patented Apr. 11, 1972

3,655,739
PROCESS FOR THE PRODUCTION OF NAPHTHA-LENESULFONIC ACID IN A PACKED REACTOR
Hermann Clasen, Falkenstein, Taunus, Germany, assignor to Farbwerke Hoechst Aktiengesellschaft vormals Meister Lucius & Bruning, Frankfurt am Main, Germany
Filed Mar. 18, 1968, Ser. No. 713,771
Claims priority, application Germany, Mar. 17, 1967, F 51,847
Int. Cl. C07c *143/24*
U.S. Cl. 260—500 C  1 Claim

ABSTRACT OF THE DISCLOSURE

The exchange of material between liquid and gaseous phases is carried out in countercurrent flow in a column which is filled with packings so as to avoid vertical re-mixing of the downward flowing liquid under the action of the ascending gaseous phase. For carrying out the processes a column is used, the length of which is great in relation to its diameter, and which is fitted out with a filling or with installations for inhibiting the remixing of the descending liquid.

Figure 1:
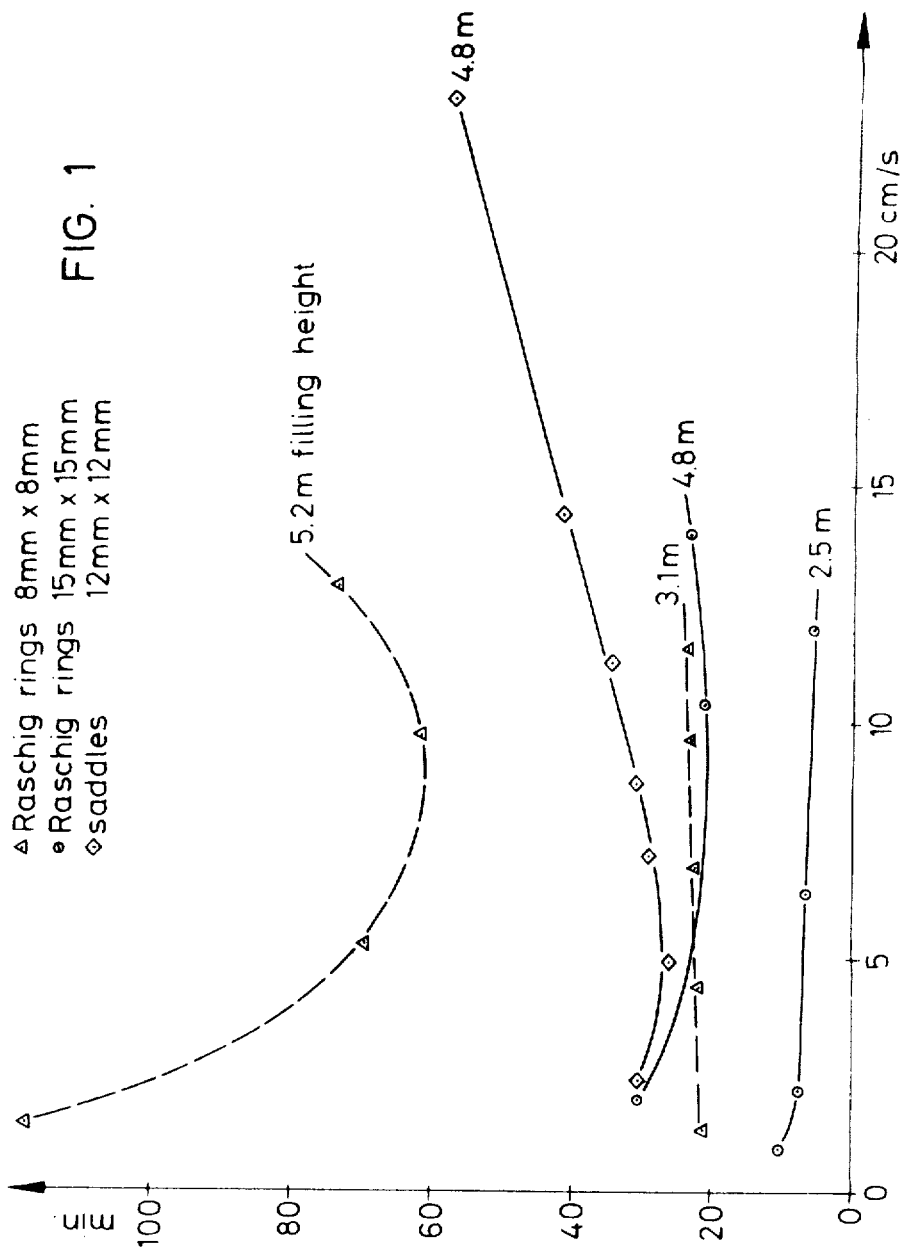

The process is especially suitable for separating 1-naphthalene-sulfonic acid from a sulfonation mixture of naphthalene-sulfonic acids by hydrolysis with superheated steam.

---

The present invention relates to a process and a device for the continuous exchange of material between gaseous and liquid phases in countercurrent flow in a vertical column at a slow rate of exchange and in a highly corrosive medium.

It has hitherto not been possible to carry out certain processes with the exchange of material between gaseous and liquid phases in a continuous manner or in countercurrent flow. This is especially true for exchange processes with extended exchange time between highly corrosive substances. Processes of this kind can be carried out neither in a trickling column—the trickling time being too short—nor in a bubble try column made of metal which would be attacked by the corrosive substances. On account of the corrosivity it is not possible either to extend the trickling time by installing fine wire nettings in the trickling column. Moreover, it may be the case that a trickling column cannot be used even with a normal rate of exchange, namely when the trickling period is extremely short owing to an insufficient wetting.

It is an object of the present invention to enable certain material exchanging processes to be carried out in countercurrent flow, which were hitherto not accessible or accessible only to a limited extent to a process of this kind.

The continuous exchange of material in countercurrent flow according to the invention is carried out in such a manner that the gaseous phase ascends in the form of bubbles, i.e., discontinuously, through the liquid phase coherently flowing downwards, while filling bodies, packings or other installations inhibit the re-mixing of the liquid phase in vertical direction.

The device according to the invention can thus be regarded as a bubble column operated in countercurrent flow which is filled with suitably dimensioned filling bodies to a sufficiently high level so that it becomes a countercurrent apparatus with multiple efficiency. The filling bodies inhibit the convectional flow caused by the ascending bubbles so that a rapid vertical re-mixing does not take place. The supply and discharge of the liquid phase is advantageously adjusted in such a manner that the height of filling bodies is equal to the level of liquid in the column.

The gaseous phase may also be a vapor. It has been found that the exchange of material according to the invention is especially favourable with a system in which the liquid phase is a boiling reaction mixture of naphthalene and sulfuric acid and the ascending discontinuous gaseous phase is superheated steam approximately having the temperature of the liquid phase. With a system of this kind the trickling time in a column filled with ceramic bodies is extremely short and insufficient because of the poor wetting, and wire nettings cannot be installed owing to the corrosivity of the liquid phase. The 1-naphthalene-sulfonic acid contained in the reaction mixture is substantially hydrolysed and yields naphthalene and sulfuric acid. In the ascending current of steam bubbles the naphthalene concentrates and is discharged with the steam. By the countercurrent action the content of 1-naphthalene-sulfonic acid is reduced to less than 1% by weight and the consumption of steam is extremely small.

The process of the invention is suitably carried out in a vertical tube the length of which is rather great with respect to the diameter and which is packed with filling bodies which are smaller than one tenth of the tube diameter.

The surprisingly simple process and device of the invention enable the countercurrent method to be used in those cases in which bubble trays appeared to be necessary but could not be used owing to the unsuitability of the material. It is known that the dimensions of bubble tray constructions of stable earthenware or graphite are limited, whereas a tube according to the invention can be produced in any desired size, for example by brick lining. The necessary ceramic filling bodies are also available.

A common feature of the process and device of the invention and of a bubble tray column is that any desired residence time of the liquid in the device can be adjusted. Whereas corrosion rapidly renders unserviceable a bubble tray column, an attack of the tube used according to the invention can often be tolerated. A cast iron tube is much cheaper than a cast iron bubble tray apparatus and it is easy to produce a tube with thick walls or to exchange such a tube. Moreover, in the device of the invention it is much easier to obviate obstructions and deposits than in a bubble tray column.

Figure 2:
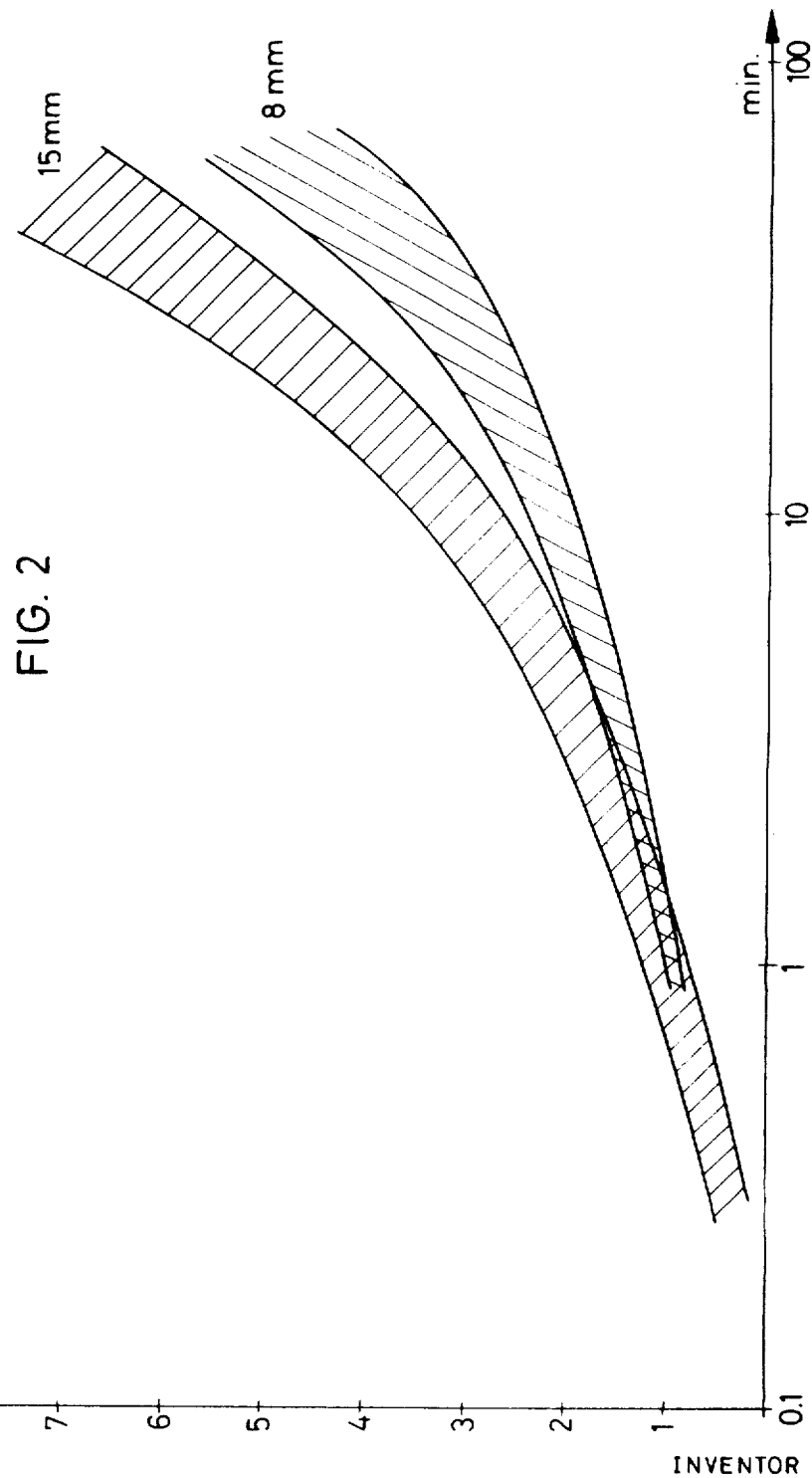

FIGS. 1 and 2 of the accompanying drawings illustrate how re-mixing is suppressed according to the invention and the countercurrent action is brought about.

FIG. 1 shows the dependence of the re-mixing period on the speed of the gaseous phase, the filling height and the shape of the filling bodies. FIG. 2 shows the connexion of the re-mixing period and the filling height with different speeds of the gaseous phase and different shapes of filling bodies.

Figure 3:
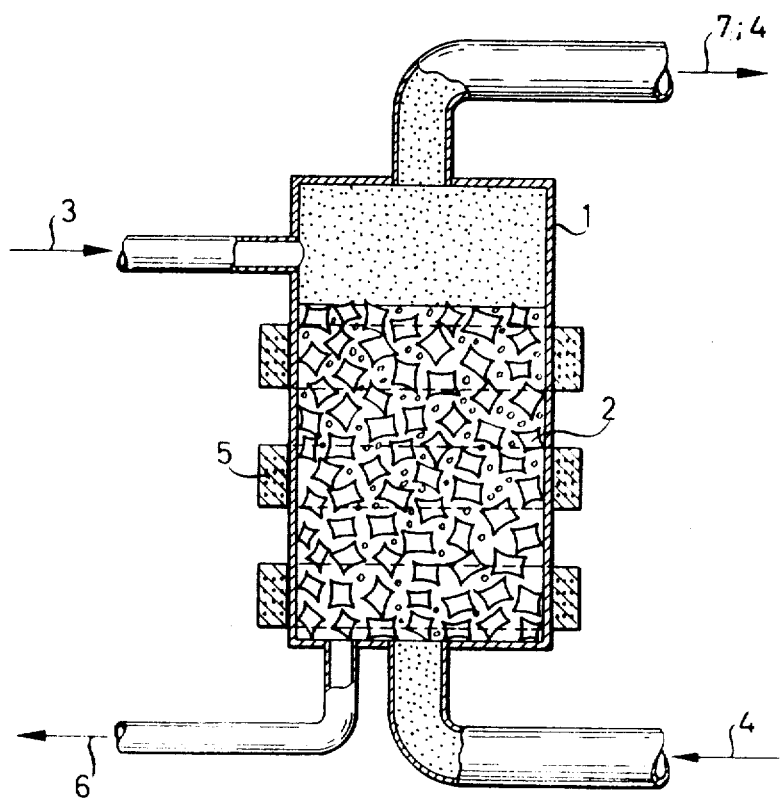

FIG. 3 diagrammatically illustrates by way of example a mode of construction of the device according to the invention.

On the abscissa of FIG. 1 is plotted the velocity of air in centimetre per second, calculated on the empty cross section of a glass tube having an inside diameter of 150 millimeters, forced from below into the tube filled with filling bodies and water. On the ordinate is plotted the time in minutes after which a pink coloration of the water at the lower end of the column could just be detected after the moment a concentrated potassium permanganate solution was introduced at the indicated filling height in meters of the filling body-liquid-gas column.

In FIG. 2 the re-mixing time is plotted on the abscissa in minutes against the filling height in meters for Raschig rings having a diameter of 15 and 8 millimeters, respectively. For the different velocities of the air the hatched zones were determined. In these cases the time of re-mixing is proportional to the square of the filling height.

The device according to the invention can be considered not only a modified bubble column but also a trickling column with coherent flow in which the liquid descends more slowly than in the trickling column.

It is obvious that the invention is not limited to those physical and chemical processes in which the amounts of the phases remain constant. When the gaseous or vaporous phase is reduced, as is the case, for example with hydrolyses, hydrogenations, phosgenations or gas absorptions, it may be more suitable to supply fresh gas or vapour at several points at suitable vertical intervals than to arrange a plurality of short columns in series.

The ratio by volume of gas to liquid in the packed column increases with the gas velocity. In contradistinction to a trickling column and to a bubble tray column the volume of the liquid is preponderant. In this respect the device of the invention is similar to a bubble column or an ascending-flow column. It has been proposed to use an ascending-flow column packed with filling bodies (Chemie-Ingenieur-Technik 1957, page 673) but in this type of column the filling bodies serve as catalyst support. As secondary effect a more uniform residence time is observed. Hence, it follows that in this case the filling bodies serve another purpose than in the process of the invention where they are used to inhibit the re-mixing of the liquid phase in vertical direction. Moreover, the ascending-flow column differs from the column with counter-current flow of the invention in that in the former the liquid and the gas ascend in parallel flow.

The following example serves to illustrate the invention but it is not intended to limit it thereto.

EXAMPLE 1-naphthalene-sulfonic acid was separated by hydrolysis with steam in a device as shown in FIG. 3 from a sulfonation mixture of naphthalene-sulfonic acids.

A tube 1 made of cast iron sections having a total length of 10 meters and an inside diameter of 250 millimeters was packed up to a height of 8 meters with ceramic saddles 2 having a nominal size of 15 millimeters. The sulfonation mixture 3 produced in known manner at 163° C. during the course of 2 hours from naphthalene and sulfuric acid of 95% strength in a molar ratio of 1:1.3 and having a content of 1-naphthalene-sulfonic acid of 6% by weight was continuously pumped in above the filling bodies 2. Below the filling bodies steam 4 was introduced which was superheated at 175° C. under a pressure of about 2 kiloponds/cm.$^2$. Heating means 5 were installed to maintain the sulfonation mixture everywhere in the column at boiling temperature so that it could not take up or give off steam. In the stationary state 200 kilograms of sulfonation mixture 3 were introduced per hour at the head and 20 kilograms per hour of steam 4 were blown in at the bottom. The liquid phase and the vaporous phase had the same level as the layer of filling bodies 2, that is to say 8 meters. The discharged liquid 6 was neutralized. It contained 0.6% by weight of 1-naphthalene-sulfonic acid. The free naphthalene 7 formed by hydrolysis with the steam 4 (12% of the amount used) was discharged with the vapour 4, condensed, separated from the water in the molten state and reconducted to the sulfonation process.

In a comparative example the sulfonation mixture was hydrolyzed by simply introducing steam into a deep vessel containing the said mixture. In order to reduce the content of 1-naphthalene-sulfonic acid to 0.6% by weight ten times the amount of steam was necessary and 20% of the naphthalene used in the sulfonation were discharged. The content of 2-naphthalene-sulfonic acid was correspondingly reduced.

The comparative example clearly illustrates the advantages of the process of the invention with countercurrent flow which cannot be carried out in a known column owing to the long period of hydrolysis of at least 30 minutes with an economical consumption of steam and the corrosivity of the sulfonation mixture.

When the exchange of material was carried out in a bubble tray column with 20 trays, on the one hand, and in a column of the invention having the same diameter, on the other, under otherwise identical conditions, the capacity of the latter column was 10 times higher, which can be explained by the fact that it is effective over the entire height of filling bodies, whereas in the bubble tray column dead spaces due to construction exist between the trays covered with liquid and the total height of the dead spaces is greater than the layers of liquid.

What is claimed is:

1. A continuous process for separating naphthalene-2-sulfonic acid and naphthalene from a boiling liquid sulfonation mixture consisting essentially of naphthalene-1-sulfonic acid, naphthalene-2-sulfonic acid, naphthalene, and sulfuric acid, comprising: hydrolyzing said naphthalene-1-sulfonic acid with steam by passing said boiling sulfonation mixture continuously to the top of a packed zone and thence downwardly in a continuous phase through a packed zone containing ceramic filling bodies, and passing steam, at about the temperature of said boiling sulfonation mixture, upwardly through said packed zone and in a discontinuous phase, in countercurrent contact with said downwardly flowing boiling sulfonation mixture, and withdrawing, from the bottom of said packed zone, said naphthalene-2-sulfonic acid formed during the said hydrolysis together with sulfuric acid and withdrawing naphthalene by steam distillation from the top of said packed zone.

References Cited

UNITED STATES PATENTS 1,922,813   8/1933   Masters _____ 260—505 C
1,390,241   9/1921   Ambler et al. _____ 260—505 C BERNARD HELFIN, Primary Examiner L. B. De CRESENTE, Assistant Examiner U.S. Cl. X.R.

23—283; 260—668 F